June 28, 1966  R. G. HENDRICKS  3,258,272
BICYCLE ATTACHMENT

Filed Jan. 22, 1964  2 Sheets-Sheet 1

INVENTOR.
ROBERT G. HENDRICKS
BY John Joseph Hall
ATTORNEY.

June 28, 1966 R. G. HENDRICKS 3,258,272
BICYCLE ATTACHMENT
Filed Jan. 22, 1964 2 Sheets-Sheet 2
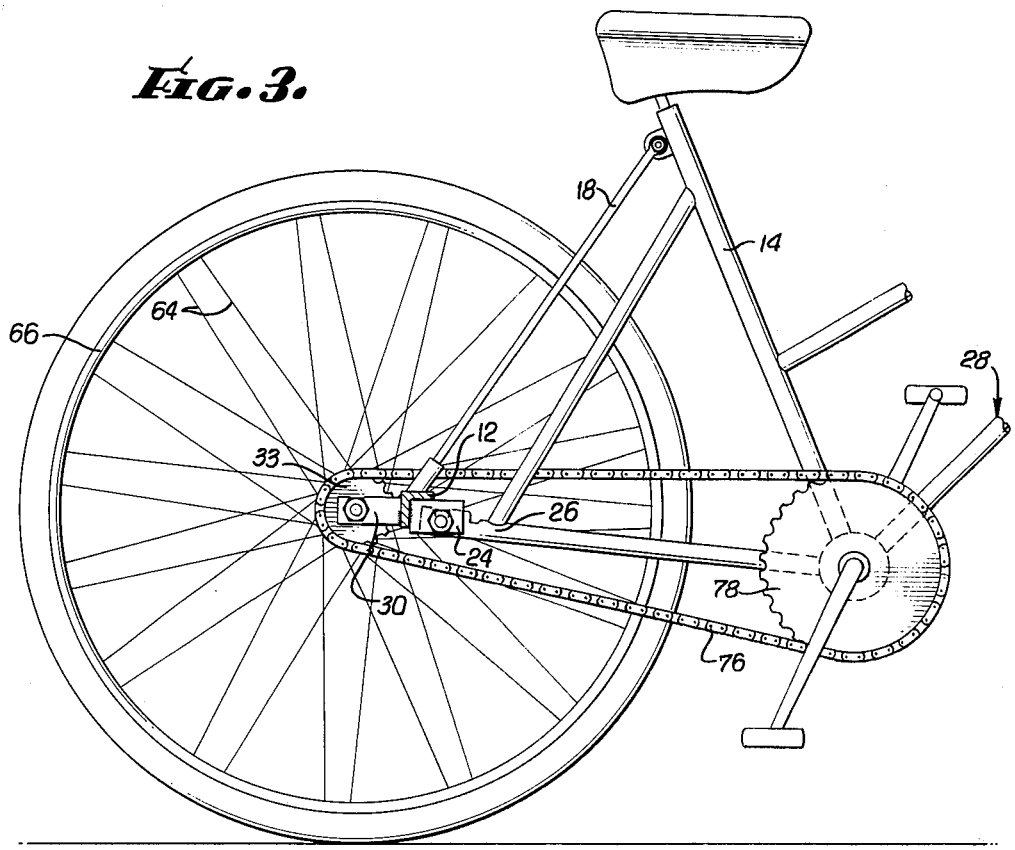
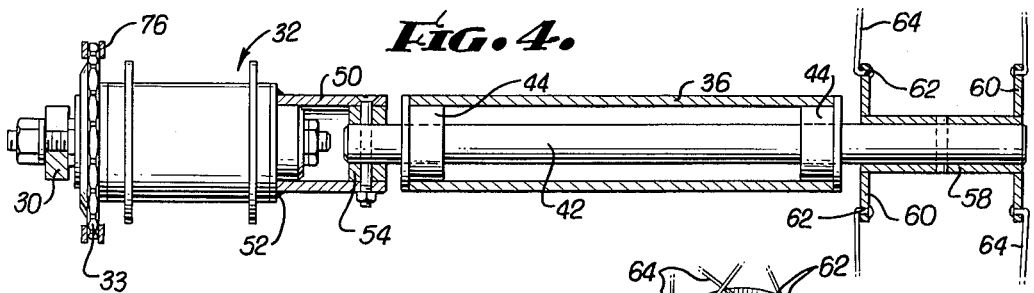
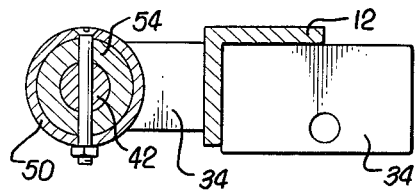
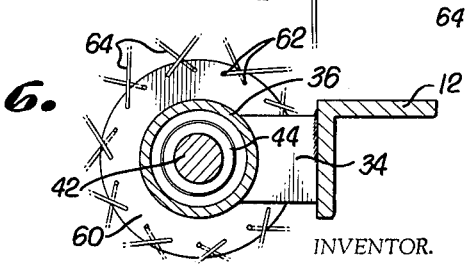
INVENTOR.
ROBERT G. HENDRICKS
BY John Joseph Hall
ATTORNEY.

3,258,272
BICYCLE ATTACHMENT
Robert G. Hendricks, 671 San Jose Drive, Hemet, Calif.
Filed Jan. 22, 1964, Ser. No. 339,477
5 Claims. (Cl. 280—7.15)

This invention relates to novel improvements in bicycle attachments, and more particularly concerns a device for conversion of a two wheel conventional bicycle to a three wheel vehicle for safety and for instruction of both children and adults who are learning to ride, and which allows the use of a multi-speed hub unit to propel the three wheel vehicle.

Hitherto, other devices for converting a two wheel bicycle into a three wheel vehicle have required the use of numerous parts and complex arrangements. Such devices have been commercially unsuccessful and have been difficult to use as well as to repair.

Further, such devices are limited in operation to a single speed hub unit, since they have no structures capable of transmitting various speeds of a multi-speed hub unit for propelling the three wheel vehicle.

It is, therefore, an object of this invention to provide a bicycle attachment converting a two wheel bicycle into a three wheel vehicle which is relatively simple and easy to assemble and operate.

Another object of this invention is to provide a bicycle attachment which is relatively easy to manufacture and contains relatively few parts.

A further object of this invention is to provide a bicycle attachment which may be used in conjunction with various types of conventional hub units for propulsion.

A still further object of this invention is to provide a bicycle attachment which may be used at various speeds as transmitted from a multi-speed hub unit.

These and other objects will be more readily understood by reference to the following description and claims, taken in conjunction with the accompanying drawings, in which FIGURE 1 is a perspective view showing the bicycle attachment in place on a conventional bicycle frame and in operation.

FIGURE 3 is a section taken along line 3—3 of FIGURE 2.

FIGURE 4 is a section taken along line 4—4 of FIGURE 2.

FIGURE 5 is a section taken along line 5—5 of FIGURE 2.

FIGURE 6 is a section taken along line 6—6 of FIGURE 2.

Figure 1:
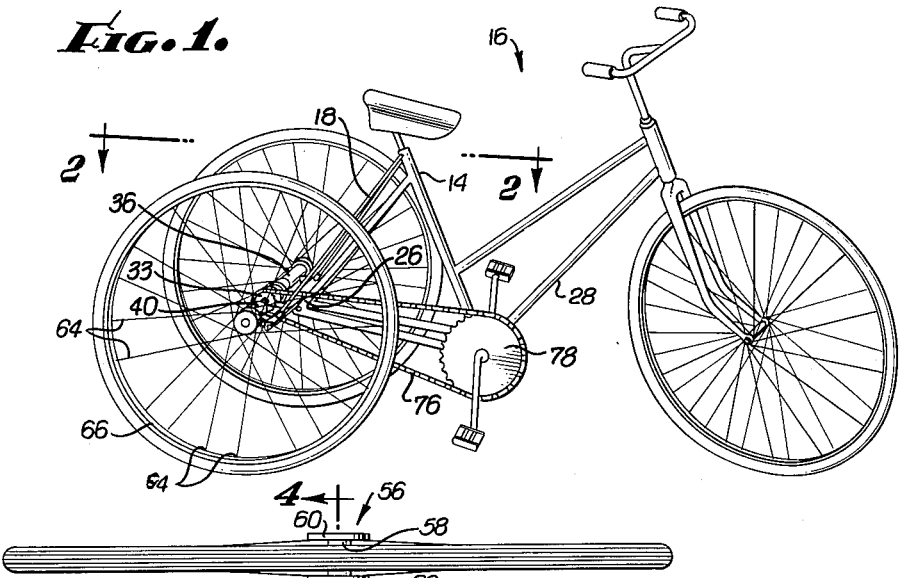
Figure 2:
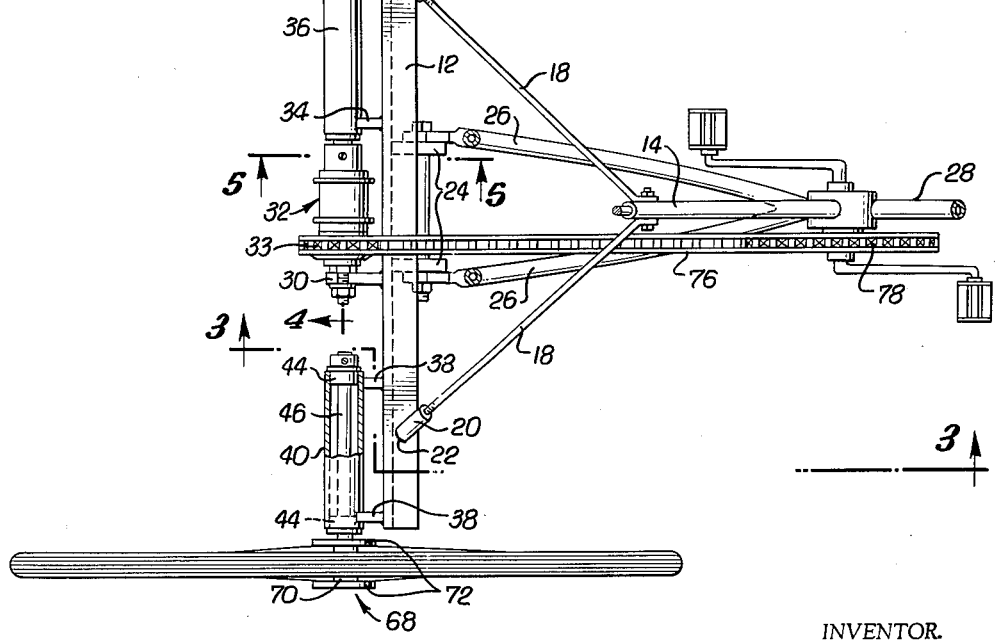
FIGURE 2 is a view taken along line 2—2 of FIGURE 1.

The bicycle attachment has a transverse support member 12 which is connected to the seat post 14 of the bicycle 16 by two radius rods 18 with their upper ends bolted to the seat post 14 and with their lower ends threaded into collars 20 which are welded or otherwise mounted at 22 on the support member 12.

The support member 12 has two lugs 24 in its front which are bolted inside the ends of the rear suspension fork 26 of the bicycle frame in the same place where the rear axle of the bicycle formerly was located.

Bracket 30 in the center of the rear of the support member 12 serves as a mount for hub unit 32 which is of conventional three speed design and is bolted or otherwise rigidly attached to bracket 30. The hub unit 32 has a sprocket 33.

Brackets 34 on the outer left hand portion of the rear of the support member 12 serve as a mount for tube 36 which is welded or otherwise rigidly attached to brackets 34, while brackets 38 on the outer right hand portion of the rear of the support member 12 provide a mount for tube 40 which is welded or otherwise rigidly attached to the brackets 38.

Tube 36 contains an axle 42 rotating within flange ball bearings 44 at each end of the tube 36. Similarly, tube 40 contains an axle 46 rotating on flange ball bearings 44 at each end of the tube 38.

One end of sleeve 50 is welded or otherwise rigidly secured to shoulder 52 of the hub unit 32 opposite the sprocket 33. The other end of the sleeve 50 fits over a collar 54 which in turn fits around the inner end of axle 42. Sleeve 50 and collar 54 are both bolted or otherwise rigidly attached to the inner end of axle 42 which extends beyond the inner end of tube 36.

The outer end of axle 42 is inserted into a hub assembly 56 comprising a collar 58 which is bolted or otherwise rigidly secured on axle 42 and has two discs 60 welded or otherwise rigidly mounted to each end of the collar 58. The discs 60 each have a series of holes 62 in their circumference to receive spokes 64 of rims 66 of conventional bicycle wheels.

Similarly, the outer end of axle 46 is inserted into a hub assembly 68 made up of a collar 70 which is bolted or otherwise rigidly secured on axle 46 and has two discs 72 welded or otherwise rigidly attached to each end of the collar 70. Discs 72 have a series of holes 74 at their outer circumferences to receive spokes 64 of rims 66 of conventional bicycle wheels.

Since axle 42 is connected to the three speed hub unit 32, axle 42 is the driving axle, while the axle 46 is a free wheeling axle.

In operation, the rear wheel including the hub of a conventional bicycle is removed and the bicycle attachment is connected to the bicycle frame 28 by bolting the lugs 24 of the support member 12 inside the rear suspension fork 26 of the bicycle frame 28. The radius rods 18 are threaded into the collars 20 and adjusted to put the bicycle attachment in the proper position and are then bolted in place on the seat post 14 of the bicycle. The drive chain 76 of the bicycle is then placed in position around sprocket 33 and around the drive sprocket 78.

If the bicycle attachment 10 is not already provided with wheels, then the spokes and rims of conventional wheels are connected to hub assembly 54 and the hub assembly 66. In this manner, a conventional bicycle is easily and simply converted into a three wheel vehicle for greater safety and for instructional purposes.

Due to the novel construction of the bicycle attachment, the resulting three wheel vehicle has the novel feature of a three-speed hub for propulsion. Other conventional multi-speed hubs may be used in addition to the three-speed hub 32. Thus, for example, a two-speed or four-speed hub may be substituted for the three-speed hub 32 illustrated.

Although I have described my invention in detail with reference to the accompanying drawings illustrating a preferred embodiment of my invention, it is understood that numerous changes in the details of construction and arrangement of parts may be made without departing from the spirit and scope of the invention as hereinafter claimed.

I claim:
1. A bicycle attachment for converting a bicycle into a three wheel vehicle with a multi-speed hub, comprising a transverse support member having means for connection to the seat post of a bicycle and adapted to be mounted inside the ends of the rear suspension fork of a bicycle frame, a multi-speed hub mounted on the rear of the support member, a pair of spaced tube members mounted on the rear of said support member, one on each side of the multi-speed hub, each tube member having an axle journaled therein with the inner end of one axle connected to the multi-speed hub, and a pair of hub assemblies each mounted at the outer end of each of the said axles and having openings in their outer circumferences to receive spokes of rims of conventional bicycle wheels.

2. A bicycle attachment for converting a bicycle into a three wheel vehicle with a multi-speed hub, comprising, a transverse support member having means for connection to the seat post of a bicycle and means for connection inside the ends of the rear suspension fork of a bicycle frame, a multi-speed hub mounted on the rear of the support member, a pair of spaced tube members mounted on the rear of said support member, one on each side of the multi-speed hub, each tube member having an axle journaled therein with the inner end of one axle connected to the multi-speed hub, and means mounted at the outer end of each axle to receive spokes of rims of conventional bicycle wheels.

3. A bicycle attachment for converting a bicycle into a three wheel vehicle with a multi-speed hub, comprising, a transverse support member having lugs in front for attachment inside the ends of the rear suspension fork of a bicycle frame and connecting rods for connecting the support member to the seat post of a bicycle, a multi-speed hub mounted on the rear of the support member, a pair of spaced tube members mounted on the rear of the said support member, one tube member on each side of the multi-speed hub, and each tube member having an axle journaled therein with one axle connected to the multi-speed hub, and means mounted at the outer end of each axle to receive spokes of rims of conventional bicycle wheels.

4. A bicycle attachment for converting a bicycle into a three wheel vehicle with a multi-speed hub, comprising, a transverse support member having means for connection to the seat post of a bicycle and means for connection inside the ends of the rear suspension fork of a bicycle frame, a pair of tube members mounted on the rear of said support member, said tube members each having an axle journaled therein and spaced to permit location of a multi-speed hub between the two members, one of said axles being adapted for connection to the multi-speed hub, and means mounted at the outer end of each axle to receive spokes of rims of conventional bicycle wheels.

5. A bicycle attachment for converting a bicycle into a three wheel vehicle with a multi-speed hub, comprising, a transverse support member having means in its front for rigid attachment of said support member to the ends of the rear suspension fork of the bicycle frame, said transverse support member having means in its rear both for rigidly mounting on it a pair of spaced tube members each having axles journaled therein and for mounting a multi-speed hub on said support member and between said axles, said support member having means for receiving connecting members connecting said support member to the bicycle frame.

References Cited by the Examiner

UNITED STATES PATENTS

| 636,570 | 11/1899 | Shugers | 280—7.1 |
| 2,816,634 | 12/1957 | Brown | 74—750 X |
| 2,910,157 | 10/1959 | Gleasman | 74—750 X |
| 2,995,378 | 8/1961 | Whetstone | 280—7.15 |

FOREIGN PATENTS 1,054,945  10/1953  France.

BENJAMIN HERSH, *Primary Examiner.*

MILTON L. SMITH, *Examiner.*